US011292898B2

(12) United States Patent
Herklots et al.

(10) Patent No.: US 11,292,898 B2
(45) Date of Patent: Apr. 5, 2022

(54) HETEROPHASIC PROPYLENE COPOLYMER

(71) Applicant: SABIC GLOBAL TECHNOLOGIES B.V., Bergen Op Zoom (NL)

(72) Inventors: Marc Herklots, Geleen (NL); Ricardo Bou Reslan Calumby, Geleen (NL); Kathleen Ann Vandewiele, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 190 days.

(21) Appl. No.: 16/468,623

(22) PCT Filed: Dec. 12, 2017

(86) PCT No.: PCT/EP2017/082454
§ 371 (c)(1),
(2) Date: Jun. 11, 2019

(87) PCT Pub. No.: WO2018/108927
PCT Pub. Date: Jun. 21, 2018

(65) Prior Publication Data
US 2019/0352491 A1  Nov. 21, 2019

(30) Foreign Application Priority Data
Dec. 12, 2016 (EP) .................................. 16203438

(51) Int. Cl.
| C08L 23/12 | (2006.01) |
| C08F 2/00 | (2006.01) |
| C08F 4/02 | (2006.01) |
| C08F 4/32 | (2006.01) |
| C08F 4/651 | (2006.01) |
| C08F 110/06 | (2006.01) |
| C08F 210/06 | (2006.01) |
| C08F 210/16 | (2006.01) |
| C08K 3/34 | (2006.01) |
| C08K 5/00 | (2006.01) |
| C08K 5/098 | (2006.01) |
| C08L 23/14 | (2006.01) |
| C08L 23/16 | (2006.01) |
| C08L 23/08 | (2006.01) |

(52) U.S. Cl.
CPC .............. *C08L 23/12* (2013.01); *C08F 2/001* (2013.01); *C08F 4/022* (2013.01); *C08F 4/32* (2013.01); *C08F 4/651* (2013.01); *C08F 110/06* (2013.01); *C08F 210/06* (2013.01); *C08F 210/16* (2013.01); *C08K 3/34* (2013.01); *C08K 5/0083* (2013.01); *C08K 5/098* (2013.01); *C08L 23/142* (2013.01); *C08L 23/16* (2013.01); C08K 2201/014 (2013.01); C08L 23/0815 (2013.01); C08L 2205/02 (2013.01); C08L 2207/02 (2013.01); C08L 2314/02 (2013.01)

(58) Field of Classification Search
CPC .............................. C08F 2/001; C08F 210/06
See application file for complete search history.

(56) References Cited

U.S. PATENT DOCUMENTS

| 4,282,076 | A | 8/1981 | Boynton |
| 4,399,054 | A | 8/1983 | Ferraris et al. |
| 4,472,524 | A | 9/1984 | Albizzati |
| 4,866,022 | A | 9/1989 | Arzoumanidis et al. |
| 9,527,989 | B2 * | 12/2016 | Herklots ................. C08K 5/52 |
| 10,240,024 | B2 * | 3/2019 | Vandewiele ........... C08K 3/346 |
| 2005/0009993 | A1 * | 1/2005 | Morioka ............... C08F 210/06 |
|  |  |  | 525/323 |
| 2009/0048399 | A1 | 2/2009 | Reijntjens et al. |
| 2010/0016510 | A1 * | 1/2010 | Malm ..................... C08L 23/16 |
|  |  |  | 525/240 |
| 2011/0065873 | A1 * | 3/2011 | Grein .................... C08F 110/06 |
|  |  |  | 526/123.1 |
| 2012/0190784 | A1 * | 7/2012 | Posch ................... C08F 210/06 |
|  |  |  | 524/427 |

(Continued)

FOREIGN PATENT DOCUMENTS

| EP | 0063654 A1 | 11/1982 |
| EP | 1935938 A1 | 6/2008 |

(Continued)

OTHER PUBLICATIONS

European Search Report; European Application No. 16203438.3; International Filing Date: Dec. 12, 2016; 2 pages.

(Continued)

*Primary Examiner* — Michael M Dollinger
(74) *Attorney, Agent, or Firm* — Cantor Colburn LLP

(57) ABSTRACT

The invention relates to a process for the preparation of a final heterophasic propylene copolymer (A) having a final melt flow rate in the range from 65 to 110 dg/min, comprising visbreaking an intermediate heterophasic propylene copolymer (A') having an intermediate melt flow rate, which intermediate melt flow rate is lower than the final melt flow rate, to obtain the final heterophasic propylene copolymer, wherein the intermediate heterophasic propylene copolymer (A') consists of (a) a propylene-based matrix, (b) a dispersed ethylene-α-olefin copolymer, wherein the sum of the total amount of propylene-based matrix and total amount of the dispersed ethylene-α-olefin copolymer in the intermediate heterophasic propylene copolymer is 100 wt % based on the intermediate heterophasic propylene copolymer.

16 Claims, No Drawings

(56) References Cited

U.S. PATENT DOCUMENTS

| | | | | |
|---|---|---|---|---|
| 2012/0302701 A1* | 11/2012 | Martin | .................... | C08F 10/06 |
| | | | | 525/191 |
| 2015/0232643 A1* | 8/2015 | Herklots | ................ | C08L 23/10 |
| | | | | 264/523 |
| 2017/0321021 A1* | 11/2017 | Tufano | ....................... | C08J 5/08 |
| 2018/0134868 A1* | 5/2018 | Vandewiele | ............ | C08K 5/14 |

FOREIGN PATENT DOCUMENTS

| | | | |
|---|---|---|---|
| WO | 2006010414 A1 | 2/2006 |
| WO | 2014202603 A1 | 12/2014 |
| WO | 2015091983 A1 | 6/2015 |
| WO | 2018108929 A1 | 12/2017 |
| WO | 2018108935 A1 | 6/2018 |
| WO | 2018108936 A1 | 6/2018 |

OTHER PUBLICATIONS

International Search Report; International Application No. PCT/EP2017/082454; International Filing Date: Dec. 12, 2017; dated Mar. 12, 2018; 3 pages.

Periodic System of the Elements (Handbook of Chemistry and Physics, 70th Edition, CRC Press, 1989-1990 (1 page).

Ser van der Ven "Polypropylene and Other Polyolefins: Polymerization and Characterization," Studies in Polymer Science, Elsevier (1990) 11 Pages.

Written Opinion; International Application No. PCT/EP2017/082454; International Filing Date: Dec. 12, 2017; dated Mar. 12, 2018; 6 pages.

* cited by examiner

HETEROPHASIC PROPYLENE COPOLYMER

CROSS REFERENCE TO RELATED APPLICATIONS

This application is a 371 of International Application No. PCT/EP2017/082454, filed Dec. 12, 2017, which is incorporated by reference in its entirety, and which claims priority to European Application Serial No. 16203438.3, filed Dec. 12, 2016.

The present invention relates to a process for the preparation of a heterophasic propylene copolymer by visbreaking an intermediate heterophasic propylene copolymer. The invention further relates to such heterophasic propylene copolymers obtainable or obtained thereby and to articles comprising such heterophasic propylene copolymers.

Heterophasic propylene copolymer, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

In the field of rigid packaging such as containers, product protection during handling transportation and storage is important. The challenge for such packaging is that that the packaging must retain its integrity throughout. Therefore, a high stiffness (flexural modulus) is important. In addition, low emissions of low molecular weight oligomers are important, because such low molecular weight materials can cause an unpleasant odor and/or a sticky feeling of the surface. High stiffness and low emissions are also very important in the field of durables, such as appliances and other house hold items.

Injection molding is a technique that is widely used to prepare rigid packaging and durables. In general, it is desirable to have a higher melt flow rate of the heterophasic propylene copolymer for injection molding, as this increases the injection speed (lessens the energy needed for the injection) and hence shortens the cycle time.

However, when increasing the melt flow rate of the heterophasic propylene copolymer, also the emission of the low molecular weight oligomers are generally increased.

Therefore, it is the object of the invention to provide heterophasic propylene copolymers having a high flow in combination with a high stiffness and low emissions.

This object is achieved by a process for the preparation of a final heterophasic propylene copolymer (A) having a final melt flow rate in the range from 65 to 110 dg/min as measured according to ISO1133 at 230° C. and 2.16 kg, comprising visbreaking an intermediate heterophasic propylene copolymer (A') having an intermediate melt flow rate, which intermediate melt flow rate is lower than the final melt flow rate, to obtain the final heterophasic propylene copolymer, wherein the intermediate heterophasic propylene copolymer (A') consists of
  (a) a propylene-based matrix,
  wherein the propylene-based matrix consists of a propylene homopolymer, wherein the melt flow rate of the propylene-based matrix is in the range from 75 to 85 dg/min as measured according to ISO1133 at 230° C. and 2.16 kg
  (b) a dispersed ethylene-α-olefin copolymer,
  wherein the amount of ethylene incorporated into the ethylene-α-olefin copolymer is in the range from 45 to 55 wt % based on the ethylene-α-olefin copolymer,
  wherein the amount of ethylene-α-olefin copolymer is less than 15 wt % and at least 10 wt % based on the intermediate heterophasic propylene copolymer,
  wherein the melt flow rate of the ethylene-α-olefin copolymer is in the range from 0.50 to 2.0 dg/min as measured according to ISO1133 at 230° C. and 2.16 kg,
  wherein the sum of the total amount of propylene-based matrix and total amount of the dispersed ethylene-α-olefin copolymer in the intermediate heterophasic propylene copolymer is 100 wt % based on the intermediate heterophasic propylene copolymer.

The melt flow rate of the ethylene-α-olefin copolymer is calculated using the values obtained by the measurements according to ISO1133 at 230° C. and 2.16 kg.

Therefore, the process according to the invention may also be described as a process for the preparation of a final heterophasic propylene copolymer (A) having a final melt flow rate in the range from 65 to 110 dg/min as measured according to ISO1133 at 230° C. and 2.16 kg, comprising visbreaking an intermediate heterophasic propylene copolymer (A') having an intermediate melt flow rate, which intermediate melt flow rate is lower than the final melt flow rate, to obtain the final heterophasic propylene copolymer, wherein the intermediate heterophasic propylene copolymer (A') consists of
  (a) a propylene-based matrix,
  wherein the propylene-based matrix consists of a propylene homopolymer, wherein the melt flow rate of the propylene-based matrix is in the range from 75 to 85 dg/min as measured according to ISO1133 at 230° C. and 2.16 kg
  (b) a dispersed ethylene-α-olefin copolymer,
  wherein the amount of ethylene incorporated into the ethylene-α-olefin copolymer is in the range from 45 to 55 wt % based on the ethylene-α-olefin copolymer,
  wherein the amount of ethylene-α-olefin copolymer is less than 15 wt % and at least 10 wt % based on the intermediate heterophasic propylene copolymer,
  wherein the melt flow rate of the ethylene-α-olefin copolymer is in the range from 0.50 to 2.0 dg/min as calculated using the following formula:

$$MFR\ EPR = 10^{\wedge}\left(\frac{\text{Log } MFR \text{ heterophasic} - \text{matrix content} * \text{Log } MFR\ PP}{\text{rubber content}}\right)$$

wherein MFR heterophasic is the melt flow rate of the intermediate heterophasic propylene copolymer measured according to ISO1133 (2.16 kg/230° C.), MFR PP is the MFR of the propylene-based matrix of the intermediate heterophasic propylene copolymer measured according to ISO1133 (2.16 kg/230° C.), matrix content is the amount of the propylene-based matrix in the intermediate heterophasic propylene copolymer and rubber content is the amount of the dispersed ethylene-α-olefin copolymer in the intermediate heterophasic propylene copolymer.

The process of the invention provides heterophasic propylene copolymers having a high melt flow rate in combination with a high stiffness, while at the same time emissions are reduced as compared to known heterophasic propylene copolymers of the same melt flow rate. In addition, mechanical properties, such as impact resistance (Izod impact) may be retained. Also, the top-load resistance of the heterophasic propylene copolymers of the invention may be increased.

Top-load testing is also known as 'crush testing' or 'compressive strength testing'. With such top-load test, the packaging material's structural resistance to a compressive load is measured, until the package deforms or collapses. This test is used to quantify the design and quality of containers.

Top-load testing is for example important to determine the stackability of containers. Containers having a high top load allow them to be stacked on top of each other without breaking, thereby avoiding the spilling of the contents of the container. A higher top load also means that in order to achieve the same top load (and hence maintain the stackability), less material is needed to make the container. This so-called down-gauging is desirable from an environmental and business perspective as packaging soon becomes waste material and excess material adds cost to the containers.

The final melt flow rate (MFR) as defined herein is the MFR of the final heterophasic propylene copolymer (the heterophasic propylene copolymer obtained after visbreaking of the intermediate heterophasic propylene copolymer).

Preferably, the final melt flow rate is in the range of 65 to 75 dg/min or in the range of 95 to 105 dg/min as measured according to ISO1133 at 230° C. and 2.16 kg.

Visbreaking

The term "visbreaking" is well known in the field of the invention. It is also sometimes referred to as (peroxide) shifting or controlled rheology. For example, methods of visbreaking polypropylene have been disclosed in U.S. Pat. No. 4,282,076 and EP 0063654.

Several different types of chemical reactions which are well known, can be employed for visbreaking propylene polymers. An example is exposure to powerful oxidizing agents. It is preferred however that visbreaking is carried out using a peroxide. Such materials, at elevated temperatures, initiate a free radical chain reaction resulting in beta-scission of the polypropylene molecules. The visbreaking may be carried out directly after polymerisation and removal of unreacted monomer and before pelletisation (during extrusion in an extruder wherein shifting of the intermediate heterophasic propylene copolymer occurs). However, the invention is not limited to such an embodiment and visbreaking may also be carried out on already pelletised polypropylene for example by melt-mixing the pelletised polypropylene with for example peroxide.

Examples of suitable peroxides are known to the person skilled in the art and include organic peroxides, for example organic peroxides which are commercially available, such as Luperco®802PP40 (di(tert-butylperoxyisopropylbenzene)).

It can easily be determined by the person skilled in the art through routine experimentation how much peroxide should be used to obtain a heterophasic polypropylene copolymer having the desired melt flow rate. This also depends on the half-life of the peroxide and on the conditions used for the melt-mixing.

For example, the amount of peroxide used will lie in the range of 0.02 to 1.0 wt %, depending on the melt flow rate of the intermediate heterophasic propylene copolymer and of the final heterophasic propylene copolymer.

Intermediate Heterophasic Propylene Copolymer (A')

Heterophasic propylene copolymers are generally prepared by polymerization of propylene (or propylene and α-olefin) in the presence of a catalyst and subsequent polymerization of an ethylene-α-olefin mixture.

The intermediate heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the intermediate heterophasic propylene copolymer is made using Ziegler-Natta catalyst.

The intermediate heterophasic propylene copolymer may be prepared by a process comprising
  polymerizing propylene in the presence of a catalyst system to obtain the propylene-based matrix and
  subsequently polymerizing ethylene and α-olefin in the propylene-based matrix in the presence of a catalyst system to obtain the dispersed ethylene-α olefin copolymer.

These steps are preferably performed in different reactors. The catalyst systems for the first step and for the second step may be the same or different.

The intermediate heterophasic propylene copolymer consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The intermediate melt flow rate (MFR) as defined herein is the MFR of the intermediate heterophasic propylene copolymer.

The intermediate heterophasic propylene copolymer has an intermediate MFR which is lower than the final MFR. The intermediate MFR may be for example for example at least 35 dg/min, for example at least 40 dg/min and/or for example at most 55, for example at most 50 dg/min as measured according to ISO1133 (2.16 kg/230° C.). Preferably, the intermediate MFR is in the range of 40 to 50 dg/min as measured according to ISO1133 (2.16 kg/230° C.).

The melt flow rate (MFR) of the propylene-based matrix, $MFR_{PP}$ matrix) may be for example at least 75 dg/min, at least 77 dg/min, at least 80 dg/min, and/or for example at most 85 or at most 83 as measured according to ISO1133 (2.16 kg/230° C.). Preferably, the $MFR_{R1}$ is in the range of 77 to 83 dg/min as measured according to ISO1133 (2.16 kg/230° C.).

Besides the propylene-based matrix, the heterophasic propylene copolymer also comprises a dispersed ethylene-α-olefin copolymer.

The amount of ethylene in the ethylene-α-olefin copolymer of the intermediate heterophasic propylene copolymer as measured by $^{13}$C NMR is from 45 to 55 wt %, for example at least 45 wt %, for example at least 47 wt % and/or at most 55, for example at most 53, for example at most 51 wt %. Preferably, the amount of ethylene in the ethylene-α-olefin copolymer of the intermediate heterophasic propylene copolymer as measured by $^{13}$C NMR is from 47 to 53 wt %. The amount of ethylene in the dispersed ethylene-α-olefin copolymer as measured by $^{13}$C NMR in the intermediate heterophasic propylene copolymer may also be referred to herein as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The amount of ethylene-α-olefin copolymer (also referred to herein as rubber content or RC) is less than 15 wt % and at least 10 wt % based on the intermediate heterophasic propylene copolymer. The amounts of the dispersed ethylene-α-olefin copolymer may be determined by $^{13}$C-NMR, as well known in the art.

The melt flow rate of the ethylene-α-olefin copolymer is in the range from 0.50 to 2.0 dg/min, for example in the range from 0.50 to 1.5 dg/min.

The MFR of the dispersed ethylene-α-olefin copolymer ($MFR_{EPR}$) is calculated taking into account the MFR of the propylene-based matrix (MFR PP) and the MFR of the heterophasic propylene copolymer (MFR heterophasic), both of which are measured according to ISO1133 (2.16 kg/230° C.), and the amount of the propylene-based matrix in the heterophasic propylene copolymer (matrix content; in wt % based on the heterophasic propylene copolymer as determined using $^{13}$C NMR) and the amount of the dispersed phase in the heterophasic propylene copolymer (rubber content (RC); in wt % based on the heterophasic propylene copolymer as determined using $^{13}$C NMR), using the following formula:

$$MFR\ EPR = 10^{\wedge}\left(\frac{\text{Log } MFR \text{ heterophasic} - \text{matrix content} * \text{Log } MFR\ PP}{\text{rubber content}}\right)$$

Preferably, the melt flow ratio of the melt flow rate of the propylene matrix to the melt flow rate of the ethylene-α-olefin copolymer is in the range of 40 to 200, preferably in the range from 50 to 150.

Preferably, in the process of the invention, the intermediate heterophasic propylene copolymer is prepared using a phthalate-free catalyst, wherein the phthalate-free catalyst has a phthalate content of less than for example 150 ppm, alternatively less than for example 100 ppm, alternatively less than for example 50 ppm, alternatively for example less than 20 ppm, for example of 0 ppm based on the total weight of the catalyst.

Polypropylene homopolymers and propylene-ethylene copolymers can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art, preferably a Ziegler-Natta catalyst is used.

In the process of the invention, the catalyst used to prepare the intermediate heterophasic propylene copolymer preferably does not contain phthalate. Examples of phthalates include but are not limited to a dialkylphthalate esters in which the alkyl group contains from about two to about ten carbon atoms. Examples of phthalate esters include but are not limited to diisobutylphthalate, ethylbutylphthalate, diethylphthalate, di-n-butylphthalate, bis(2-ethylhexyl) phthalate, and diisodecylphthalate.

In the context of the present invention, "phthalate-free" means having a phthalate content of less than for example 150 ppm, alternatively less than for example 100 ppm, alternatively less than for example 50 ppm, alternatively for example less than 20 ppm based on the total weight of the catalyst, for example having a phthalate content of 0 ppm.

Ziegler-Natta catalyst systems are well known in the art. The term normally refers to catalyst systems comprising a transition metal containing solid catalyst compound (a) and an organo-metal compound (b). Optionally one or more electron donor compounds (external donor) (c) may be added to the catalyst system as well.

The transition metal in the transition metal containing solid catalyst compound is normally chosen from groups 4-6 of the Periodic Table of the Elements (Newest IUPAC notation); more preferably, the transition metal is chosen from group 4; the greatest preference is given to titanium (Ti) as transition metal.

Although various transition metals are applicable, the following is focused on the most preferred one being titanium. It is, however, equally applicable to the situation where other transition metals than Ti are used. Titanium containing compounds useful in the present invention as transition metal compound generally are supported on hydrocarbon-insoluble, magnesium and/or an inorganic oxide, for instance silicon oxide or aluminum oxide, containing supports, generally in combination with an internal electron donor compound. The transition metal containing solid catalyst compounds may be formed for instance by reacting a titanium (IV) halide, an organic internal electron donor compound and a magnesium and/or silicon containing support. The transition metal containing solid catalyst compounds may be further treated or modified with an additional electron donor or Lewis acid species and/or may be subjected to one or more washing procedures, as is well known in the art.

Suitable phthalate free Ziegler-Natta catalysts, which may suitably be used to prepared the intermediate heterophasic propylene copolymer of the invention are described in WO2015/091983, hereby incorporated by reference.

In a preferred embodiment, the intermediate heterophasic propylene copolymer is prepared from propylene, ethylene and optionally another α-olefin by contacting propylene, ethylene and optionally another α-olefin in the presence of a catalyst composition to obtain the intermediate heterophasic propylene copolymer, wherein said catalyst composition is prepared by combined a procatalyst with a co-catalyst and optionally at least one external donor to form the catalyst composition, wherein the procatalyst is prepared by a process comprising the steps of providing a magnesium-based support, contacting said magnesium-based support with a Ziegler-Natta type catalytic species, an internal donor, and an activator, to yield a procatalyst, wherein the activator is a benzamide according to formula X:

Formula X

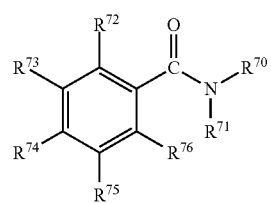

wherein $R^{70}$ and $R^{71}$ are each independently selected from hydrogen or an alkyl, and $R^{72}$, $R^{73}$, $R^{74}$, $R^{75}$, $R^{76}$ are each independently selected from hydrogen, a heteroatom or a hydrocarbyl group, preferably selected from alkyl, alkenyl, aryl, aralkyl, alkoxycarbonyl or alkylaryl groups, and one or more combinations thereof; and wherein the internal donor is selected from the group consisting of 1,3-diethers represented by the Formula VII,

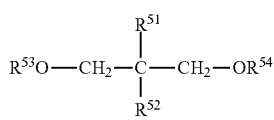

Formula VII wherein $R^{51}$ and $R^{52}$ are each independently selected from a hydrogen or a hydrocarbyl group selected from alkyl, alkenyl, aryl, aralkyl, alkoxycarbonyl or alkylaryl groups, and one or more combinations thereof and wherein R53 and R54 are each independently selected from a hydrocarbyl group, preferably selected from alkyl, alkenyl, aryl, aralkyl, alkoxycarbonyl or alkylaryl groups, and one or more combinations thereof, Preferably, said procatalyst preparation process comprises the steps of
A) providing said procatalyst obtained via a process comprising the steps of:
i) contacting a compound $R^4{}_z MgX^4{}_{2-z}$ with an alkoxy- or aryloxy-containing silane compound to give a first intermediate reaction product, being a solid $Mg(OR^1)_x X^1{}_{2-x}$, wherein: $R^4$ is the same as $R^1$ being a linear, branched or cyclic hydrocarbyl group independently selected from alkyl, alkenyl, aryl, aralkyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;
ii) contacting the solid $Mg(OR^1)_x X^1{}_{2-x}$ obtained in step i) with at least one activating compound to obtain a second intermediate product; wherein: $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl or alkylaryl groups, and one or more combinations thereof; wherein said hydrocarbyl group may be substituted or unsubstituted, may contain one or more heteroatoms, and preferably has from 1 to 20 carbon atoms; and
iii) contacting the first or second intermediate reaction product, obtained respectively in step i) or ii), with a halogen-containing Ti-compound, an activator according to Formula X and an internal electron donor according to Formula VII to obtain said procatalyst.

Preferably, in said process hydrocarbyl groups $R^{53}$ and $R^{54}$ each have from 1 to 10 carbon atoms, preferably from 1 to 9 carbon atoms, more preferably from 1 to 6 carbon atoms.

Preferably, in said process, the internal donor is selected from the group consisting of 1,3-dimethoxypropane, 1,3-diethoxypropane, 1,3-dibutoxypropane, 1-methoxy-3-ethoxypropane, 1-methoxy-3-butoxypropane, 1-methoxy-3-cyclohexoxypropane, 2,2-dimethyl-1,3-dimethoxypropane, 2,2-diethyl-1,3-dimethoxypropane, 2,2-di-n-butyl-1,3-dimethoxypropane, 2,2-diiso-butyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenyllethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-npropyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-phenyl-1,3-dimethoxypropane, 2-methyl-2-cyclohexyl-1,3-dimethoxypropane, 2,2-bis(pchlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxy propane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-di-n-butoxypropane, 2-isobutyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3,7-dimethyloctyl) 1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicylopentyl-1,3-dimethoxypropane, 2-n-heptyl-2-n-pentyl-1,3-dimethoxypropane, 9,9-bis(methoxymethyl)fluorene, 1,3-dicyclohexyl-2,2-bis(methoxymethyl)propane, 3,3-bis(methoxymethyl)-2,5-dimethylhexane, or any combination of the foregoing, for example wherein the internal donor is selected from the group of 1,3-dicyclohexyl-2,2-bis(methoxymethyl)propane, 3,3-bis(methoxymethyl)-2,5-dimethylhexane, 2,2-dicyclopentyl-1,3-dimethoxypropane and any combinations thereof. Most preferably, the internal donor is 9,9-bis(methoxymethyl)fluorene.

Examples of internal donors are known to the person skilled in the art and include but are not limited to external electron donors chosen from the group of a compound having a structure according to Formula III $(R^{90})_2N-Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS) or diisobutyl dimethoxysilane (DiBDMS).

As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, triisobutylaluminum, trihexylaluminum, di-isobutylaluminum hydride, trioctylaluminium, dihexylaluminum hydride and mixtures thereof, most preferably, the cocatalyst is triethylaluminium (abbreviated as TEAL).

The molar ratio of aluminum to titanium may for example be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

In said process for the preparation of the procatalyst, for the example, the activator according to Formula X, is an activator having at least one of $R^{70}$ and $R^{71}$ is an alkyl group, wherein the alkyl has from 1 to 6 carbon atoms, preferably from 1 to 3 carbon atoms, preferably wherein both $R^{70}$ and $R^{71}$ are alkyl. Most preferably, the activator is N,N-dimethylbenzamide.

Preferably, in the process of the invention, the propylene-based matrix of the intermediate heterophasic propylene copolymer has a molecular weight distribution ($M_w/M_n$) in the range from 4.0 to 5.5, wherein Mw stands for the weight average molecular weight and Mn stands for the number average molecular weight are measured by SEC analysis with universal calibration according to ISO 16014-1(4): 2003.

Preferably, in the process of the invention, wherein the final heterophasic propylene copolymer shows an emission of less than 1800 mg/kg, preferably less than 1700 mg/kg, more preferably less than 1600 mg/kg heterophasic propylene copolymer as determined by isopropanol extraction and analysis of the extract using PTV-GC-MS (as described herein).

Preferably, in the process of the invention, the shifting ratio, which is the ratio of the final melt flow rate to the intermediate melt flow rate is in the range from 1.3 to 2.5, for example from 1.5 to 2.2.

In another aspect, the invention relates to a heterophasic propylene copolymer (A) obtainable or obtained by the process of the invention.

The heterophasic propylene copolymers of the invention combine a high flow (in the range from 65 to 110 dg/min) with low emissions, while retaining other properties, such as high stiffness. Since the stiffness is high, this may allow the heterophasic propylene copolymers of the invention to be used to prepare containers (or other articles) with less material to achieve the same top load or to prepare articles (from the same amount of material) having a higher top load.

As a consequence, the heterophasic propylene copolymer of the invention are suitable for the production of (injection molded) articles, for example for rigid packaging of food or non-food items or for example durables, such as appliances and lawn and garden equipment.

Preferably, the impact strength of the final heterophasic propylene copolymer (A) is at least 3.5 kJ/m² as determined at 23° C. according to ISO 180 4A (test geometry: 65*12.7*3.2 mm, notch 45° according to ISO 37/2 perpendicular orientation). For example, the impact strength of the final heterophasic propylene copolymer is at most 7.0 kJ/m².

In another aspect, the invention relates to a composition comprising the heterophasic propylene copolymer (A) of the invention.

Preferably, the composition of the invention further comprises a nucleating composition (B), wherein the nucleating composition (B) comprises (i) a first nucleating agent, which comprises a cyclic dicarboxylate salt compound; and (ii) a second nucleating agent, which comprises talc, wherein the cyclic dicarboxylate salt compound has the formula (I):

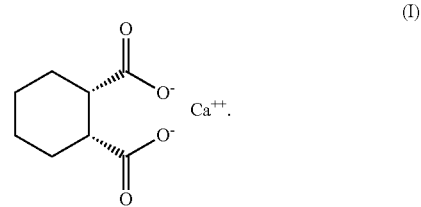 [SMILES: O=C([O-])[C@H]1CCCC[C@H]1C(=O)[O-]]

(B) Nucleating Composition

The first nucleating agent in the composition according to the present invention comprises a calcium cis-hexahydrophthalate compound of Formula (I).

Hyperform® HPN-20E™ nucleating agent commercialized by Milliken comprises such a calcium cis-hexahydrophthalate compound of Formula (I) and a stearate-containing compound as acid scavenger, e.g. zinc stearate.

The nucleating composition according to the present invention comprises talc as second nucleating agent.

Talc is a common additive in industry, mostly used as reinforcing agent or filler and also as nucleating agent for various polymer compositions. Talc typically is considered a filler when employed in relatively high amounts, for example of about from 10 to 50 wt %, based on the total polymer composition. When talc is used under 5 wt %, it is no longer considered a filler but acts as nucleating agent.

Talc may be employed in present invention in powder form, preferably having a particle size distribution defined by a $d_{50}$ of from 0.1 to 20 μm; more preferably of from 0.5 to 15 μm; or from 0.7 to 8 μm to improve its nucleating behaviour.

The first nucleating agent and the second nucleating agent can be present in the nucleating composition according to the invention in widely varying amounts, for example in a weight ratio of from 1:1200 to 2:1; preferably in a ratio of from 1:500 to 1:1; more preferably in a ratio of from 1:100 to 1:2; even more preferably in a ratio of from 1:50 to 1:5. The advantage of adding these components within these ratio limits lies in the possibility to control dimensional stability at fast cycle times and mechanical properties.

The nucleating composition may be employed as powder, dry mix or liquid blend. It may be also mixed with other additives to form an additive pre-blend or it may be blended with a binder material in low concentrations, such as a wax or thermoplastic polymer that is compatible with the polymer for which the composition is intended to serve as nucleating agent. The nucleating composition can also be combined with a thermoplastic polymer as a masterbatch or concentrate. These blends may be provided, optionally, with acid scavengers and other additives, such as stabilizers; primary and secondary antioxidants. Suitable acid scavengers can include zinc stearate, calcium stearate or other stearate-based compounds, and hydrotalcite.

The composition according to present invention preferably contains of from 0.0025 to 0.1 wt % of the first nucleating agent based on the total composition. A certain minimum amount of the first nucleating agent is needed to effectively influence nucleating behaviour and properties the composition further comprising talc as nucleating agent; preferably, the nucleating composition contains therefore at least 0.0040, for example at least 0.0050, for example at least 0.0080, for example at least 0.010 wt % of the first nucleating agent. Further increasing the amount of the first nucleating agent in the composition to above 0.25 wt % would hardly contribute to improving the properties of final product. Preferably, the nucleating composition thus contains at most 0.08, 0.06, 0.05, 0.04 wt % of the first nucleating agent. It is a special advantage of the present invention that a relatively low amount of the first nucleating agent can be applied, in combination with the talc-based second nucleating agent; giving not only improved performance but also a cost-effective solution.

The amount of talc used as second nucleating agent in the composition is preferably up to 5.0 wt %, based on the total composition. The amount of talc used as second nucleating agent in the composition is preferably from 0.10 to 5.0 wt %, more preferably from 0.20 to 4.0 wt %; or from 0.30 to 3.0 wt %, based on the total composition. A certain minimum amount of talc is necessary to provide nucleating effect and good mechanical characteristics, such as stiffness. Preferably, the nucleation composition contains thus at least 0.20, 0.30 or even 0.40 wt % of talc. For example, the nucleating composition contains about 0.49 to 0.51 wt % of talc, for example about 0.50 wt % of talc. If the nucleating composition would contain more than 3.0 wt % of talc, the additional amount might only behave as filler agent. Preferably, the nucleation composition contains therefore at most 4.0 or 3.0 wt % of talc.

(C) Optional Components

The composition according to the invention may further comprise additives as optional components. The additives may include stabilisers, e.g. heat stabilisers, anti-oxidants, UV stabilizers; colorants, like pigments and dyes; clarifiers; surface tension modifiers; lubricants; flame-retardants; mould-release agents; flow improving agents; anti-static agents; blowing agents; inorganic fillers and reinforcing agents; and/or components that enhance interfacial bonding between polymer and filler, such as a maleated polypropylene.

The skilled person can readily select any suitable combination of additives and additive amounts without undue experimentation. The amount of the additives depends on their type and function and for example is of from 0 to about 10 wt %. The amount of the additives may e.g. be from about 0.1 to about 5 wt % based on the total composition.

The sum of all components added in the process of the invention to form the composition comprising (A) the heterophasic propylene copolymer, (B) the nucleating composition and (C) the optional components preferably adds up to 100% by weight.

For example, the total of components (A) and (B) is at least 70 wt %, at least 80 wt %, at least 90 wt %, at least 95 wt %, at least 97 wt %, at least 98 wt %, at least 99 wt %, at least 99.5 wt % of the total composition.

For example, the composition comprising the final heterophasic propylene copolymer (A) according to the invention and the nucleating composition (B) has a flexural modulus of at least 1600 and for example, at most 3000 MPa (3000N/mm$^2$) as determined at 23° C. in parallel direction as measured according to ASTM D790 Procedure B on a sample of 65×12.7×3.2 mm.

For example, the composition comprising the final heterophasic propylene copolymer (A) according to the invention and the nucleating composition (B) has a flexural modulus of at least 1600 and for example, at most 3000 MPa (3000N/mm$^2$) as determined at 23° C. in perpendicular direction as measured according to ASTM D790 Procedure B on a sample of 65×12.7×3.2 mm.

Preferably, the composition comprising the final heterophasic propylene copolymer (A) according to the invention and the nucleating composition (B) has a flexural modulus of at least 1600 and for example, at most 3000 MPa (3000N/mm$^2$) as determined at 23° C. in parallel and in perpendicular direction as measured according to ASTM D790 Procedure B on a sample of 65×12.7×3.2 mm.

In another aspect, the invention relates to an article comprising the heterophasic propylene copolymer of the invention or the composition of the invention.

Suitable examples of processing techniques to make such article include injection moulding.

In particular, the invention relates to an article comprising the composition according to the invention, wherein the article is for example made by injection moulding. Injection moulding is widely used to produce articles such as for example rigid packaging, such as containers for food or non-food items, or for durables, such as consumer goods, for example appliances, suitcases, storage boxes for kitchen and office, lawn and garden equipment, toys, etc.

Therefore, the invention also relates to an article according to the invention, wherein the article is an (injection molded) article, for example a rigid packaging materials, for example a pail or a container, for food or non-food items, or a durable article, such as a storage box, suitcase, appliance or lawn and garden equipment.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

E1. Preparation of Heterophasic Copolymer

Gas-phase polymerizations were performed in a set of two horizontal, cylindrical reactors in series, wherein a homopolymer was formed in the first reactor and an ethylene-propylene copolymer rubber in the second one to prepare an impact copolymer. The first reactor was operated in a continuous way, the second one in a batch manner. In the synthesis of the homopolymer, the polymer was charged into the secondary reactor blanketed with nitrogen. The first reactor was equipped with an off-gas port for recycling reactor gas through a condenser and back through a recycle line to the nozzles in the reactor. Both reactors had a volume of one gallon (3.8-liter) measuring 10 cm in diameter and 30 cm in length. In the first reactor liquid propylene was used as the quench liquid; for the synthesis of copolymers the temperature in the second reactor was kept constant by a cooling jacket. A high activity catalyst produced in accordance with WO2015/091983 (hereby incorporated by reference) was introduced into the first reactor as a 5-7 wt. % slurry in hexane through a liquid propylene-flushed catalyst addition nozzle. Diisopropylmethoxysilane and TEAl in hexane at an Al/Mg ratio of 4 and Al/Si ratio of 6 were fed to the first reactor through a different liquid propylene flushed addition nozzle. During operation, polypropylene powder produced in the first reactor passed over a weir and was discharged through a powder discharge system into the second reactor. The polymer bed in each reactor was agitated by paddles attached to a longitudinal shaft within the reactor that was rotated at about 50 rpm in the first and at about 75 rpm in the second reactor. The reactor temperature and pressure were maintained at 71° C. and 2.2 MPa in the first and for the copolymer synthesis at 66° C. and 2.2 MPa in the second reactor. The production rate was about 200-250 g/h in the first reactor in order to obtain a stable process. By varying the amount of hydrogen in the first reactor, homopolymers with different melt flow rates were obtained. For the copolymer synthesis, hydrogen was fed independently to both reactors to control a melt flow rate ratio over the homopolymer powder and copolymer powder. The composition of the ethylene-propylene copolymer (RCC2) was controlled by adjusting the ratio ethylene and propylene (C2⇔/C3⇔) in the recycling gas in the second reactor based on gas chromatography analysis. In this respect, RCC2 is the amount of ethylene incorporated in the rubber fraction (wt. %) and RC is the amount of rubber incorporated in the impact copolymer (wt. %) determined by $^{13}$C-NMR spectroscopy.

Reaction conditions were as described in US2009/0048399A1.

Catalyst CE

Catalyst CE was prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_n SiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

Comparative Example 1 (CE1)

Example 1 was repeated with catalyst CE (the preparation of which is described above).

Comparative Example 2 (CE2)

Example 1 was repeated with using a hydrogen concentration such that the MFR of the heterophasic propylene copolymer was 71 dg/min Comparative Example 3 (CE3)

Example 1 was repeated with catalyst CE (the preparation of which is described above) and with using a hydrogen concentration such that the MFR of the heterophasic propylene copolymer was 52 dg/min.

It should be clear to the skilled person that any other phthalate free catalyst may also be used in the process for the preparation of the heterophasic propylene copolymer.

Mechanical Properties

The heterophasic propylene copolymer was mixed with a nucleating composition and other additives as described in Table 1.

The amount of the dispersed phase in the heterophasic copolymer (RC) and the amount of ethylene in the dispersed phase (RCC2) as measured by $^{13}$C NMR are summarized in Table 1.

The MFR of the heterophasic propylene copolymer and the matrix phase as measured according to ISO1133 (2.16 kg/230° C.) are also summarized in Table 1. In addition, the calculated MFR of the dispersed ethylene-α-olefin copolymer is also indicated in Table 1.

The temperature profile in the extruder was 20-20-30-50-100-170-220-220-240° C., at a throughput of 2.5 kg/h at 300 rpm. Pellets were obtained from the extruder.

Impact strength was determined by measuring the Izod impact strength at 23° C., 0° C. and −20° C. according to ISO 180 4A. Test geometry: 65*12.7*3.2 mm, notch 45° according to ISO 37/2, in perpendicular orientation (L).

Flexural modulus was determined according to ASTM D790-10 at 23° C. in parallel (II) and perpendicular orientation (L).

RCC2

RCC2 is the ethylene content in the rubber part of the heterophasic propylene copolymer. RCC2 was measured with $^{13}$C-NMR according to known procedures.

$M_w/M_n$

The procedure of ISO 16014-1(4): 2003 was followed to measure Mn, Mw and Mz of the intermediate heterophasic copolymer using SEC-DV with universal calibration. SEC measurements were performed on Polymer Laboratories PL-GPC220 (Agilent Technologies, Church Stretton, United Kingdom) three coupled columns type PLgel Olexis (Agilent). The samples were dissolved in 1,2,4-trichlorobenzene (TCB) stabilized with 1 g/L butylhydroxytoluene (BHT) at concentrations of 0.3-1.3 mg/mL for 4 hours at 160° C. and filtered through 1.2 μm filter prior to injection. 300 μL of polymer solution was injected and the mobile phase flow rate was 1.0 ml/min. Detectors used were built-in refractive index detector and a differential viscometer. For setting up the universal calibration line polyethylene standards were used.

Visbreaking

For achieving high flow propylene heterophasic copolymers, the intermediate heterophasic propylene copolymer powders of E1 and CE1 were peroxide shifted (i.e. visbroken) to higher melt flow rates to obtain the final heterophasic propylene copolymers. This was done by feeding the powder and the additives (as listed in Table 1) to an extruder and adding Luperco 802PP40 as a peroxide (1,4-bis(2-tert-butylperoxypropan-2-yl)benzene, CAS Registry Number: 2781-00-2) in a concentration such as to achieve a melt flow rate of about 70 dg/min. The additives and the peroxide were mixed with the intermediate heterophasic propylene copolymer prior to dosing it to the hopper of the extruder. The temperature profile in the extruder was 20-20-40-100-170-230-240-240-240° C., at a throughput of 4 kg/h at 300 rpm.

For the emissions and migration evaluations, the resulting granules were sealed in airtight aluminum packaging immediately after the extrusion. For the mechanical evaluation, granules were used without further precautions.

Alkane Emission Measurement (Method 1)

A thermal desorption (TD) unit coupled to a GC-(FID)-MS system is used for the determination of the outgas of the sample. Approximately 50 mg polymer was cryogenically milled and placed in a middle of a desorption tube. The tube is heated for 30 minutes at 200° C. in the oven of the TD unit under a flow of helium. The released volatiles are trapped on a sorbent-filled cryotrap and in a second stage further released towards the GC system by heating the cryotrap. A boiling-point based GC separation is performed and components of the outgas are detected simultaneously with FID and MS. FID signal is used for quantification of the outgas (total and per alkane cluster). Alkane clusters are identified based on MS data (mass of assumed molecular ion).

Isopropanol Extraction (Method 2)

5 gram of uncut pellets was extracted with 200 mL isopropanol using 8 hours boiling under reflux. The extracts were concentrated by evaporating the solvent to 20 ml. The extracts were analysed with PTV-GC-MS (programmable temperature vaporizer-gas chromatography-mass spectrometry). 10 microliter of sample was injected at 85° C. The extracts were injected without further treatment. Temperature program: Initial 75° C., hold for 0.5 min, ramp 10° C./min until 320° C., hold for 20 min. Detection: 30-500 AMU. Calculations were performed against an external standard of naphthalene The results are shown in tables 1, 2 and 3 below. In Tables 1, 2 and 3, NA stands for not applicable. Examples CE2 and CE3 are reactor grades, which were not subjected to visbreaking (peroxide shifting/treatment) as they already show the desired MFR.

TABLE 1

Properties of the intermediate heterophasic propylene copolymer before the peroxide shifting step

| Examples | E1 | E2 | CE1 | CE2 |
|---|---|---|---|---|
| Intermediate heterophasic propylene copolymer (A') | | | NA | NA |
| MFR of (A') | 45 | 45 | | |
| MFR PP matrix | 86 | 82 | | |
| Mw/Mn PP matrix | 4.9 | 5.9 | | |
| RC (wt % based on A') | 14.8 | 12.8 | | |
| RCC2 (wt % based on rubber phase) | 55.4 | 46.8 | | |
| Talc (wt %) | 0.5 | 0.5 | 0.5 | 0.5 |
| HPN20E (wt %) | 0.025 | 0.025 | 0.025 | 0.025 |
| Additives: antistatic agents, clarifiers, anti-oxidants, acid scavengers (wt %) | 0.35 | 0.35 | 0.35 | 0.35 |

For E1 and E2, the MFR of the rubber phase (dispersed ethylene-propylene) was calculated to be 1.08 and 0.75, respectively, according to the following formula:

$$MFR\ EPR = 10^{\wedge}\left(\frac{\text{Log } MFR \text{ heterophasic} - \text{matrix content} * \text{Log } MFR\ PP}{\text{rubber content}}\right)$$

TABLE 2 properties of the final heterophasic propylene copolymer after the peroxide shifting step.

| Properties of final heterophasic propylene copolymer (A) | Examples | | | |
|---|---|---|---|---|
| | E1 | E2 | CE1 | CE2 |
| MFR of (A) | 68 | 66 | 66 | 52 |
| MFR PP matrix | NA | NA | 142 | 86 |
| Mw/Mn PP matrix | NA | NA | 4.8 | 5.9 |
| RC (wt % based on A) | 12.8 | 14.8 | 14.0 | 18.5 |
| RCC2 (wt % based on rubber) | 46.8 | 55.4 | 48.1 | 53.0 |
| MFR rubber | NA | NA | 1.1 | NA |
| Ratio MFR PP matrix/MFR rubber | NA | NA | 127 | NA |
| Izod impact // 0° C. (kJ/m$^2$) | 3.2 | 2.6 | 3.0 | 4.5 |
| Izod impact // 23° C. (kJ/m$^2$) | 4.9 | 3.8 | 4.3 | 6.7 |
| Izod impact // −20° C. (kJ/m$^2$) | 3.4 | 3.0 | 2.6 | 4.0 |
| Flexural modulus // 23° C. (N/mm$^2$) | 1673 | 1661 | 1724 | 1466 |

TABLE 3

Emissions (method 1)

| Alkane emissions (ppm) (method 1) | CE1 | E1 | CE2 |
|---|---|---|---|
| C6 | 25 | 37 | 63 |
| C9 | 193 | 173 | 281 |
| C12 | 386 | 382 | 516 |
| C15 | 377 | 349 | 432 |
| C18 | 354 | 355 | 418 |
| C21 | 325 | 285 | 342 |
| C24 | 309 | 273 | 324 |
| C27 | 269 | 240 | 287 |

TABLE 3-continued

Emissions (method 1)

| Alkane emissions (ppm) (method 1) | CE1 | E1 | CE2 |
|---|---|---|---|
| C30 | 210 | 187 | 226 |
| C33 | 124 | 119 | 152 |
| C6 + C8-C33 | 2571 | 2400 | 3041 |
| C8-C33 | 2546 | 2363 | 2978 |

TABLE 4 alkane emissions-isopropanol extraction method (method 2)

| Alkane (mg/kg final heterophasic propylene copolymer) | CE1 | CE2 | E1 | CE3 |
|---|---|---|---|---|
| C12 | 16 | 17 | 7 | 10 |
| C15 | 123 | 153 | 73 | 110 |
| C18 | 331 | 391 | 199 | 295 |
| C21 | 391 | 463 | 252 | 365 |
| C24 | 394 | 391 | 264 | 356 |
| C27 | 340 | 334 | 225 | 298 |
| C30 | 264 | 270 | 190 | 262 |
| C33 | 176 | 193 | 116 | 152 |
| C36 | 110 | 151 | 63 | 94 |
| C39 | 42 | 65 | 32 | 39 |
| total alkane | 2186 | 2428 | 1421 | 1981 |

CONCLUSION

As can be seen from Tables 1, 2, 3 and 4 above, with the process of the invention, a heterophasic propylene copolymer can be produced having a high flow (in the range from 65 to 110 dg/min) and low emissions, while retaining other properties, such as high stiffness. Since the stiffness is high, this may allow the heterophasic propylene copolymers of the invention to be used to prepare containers (or other articles) with less material to achieve the same top load or to prepare articles (from the same amount of material) having a higher top load.

As a consequence, the heterophasic propylene copolymers of the invention are suitable for the production of (injection molded) articles, for example for rigid packaging of food or non-food items or for example durables.

The invention claimed is:

1. A process for the preparation of a final heterophasic propylene copolymer (A) having a final melt flow rate in the range from 65 to 110 dg/min as measured according to ISO1133 at 230° C. and 2.16 kg, comprising:

visbreaking an intermediate heterophasic propylene copolymer (A') having an intermediate melt flow rate, which intermediate melt flow rate is lower than the final melt flow rate, to obtain the final heterophasic propylene copolymer, wherein the intermediate heterophasic propylene copolymer (A') consists of
(a) a propylene-based matrix, wherein the propylene-based matrix consists of a propylene homopolymer, wherein the melt flow rate of the propylene-based matrix is in the range from 75 to 85 dg/min as measured according to ISO1133 at 230° C. and 2.16 kg,
(b) a dispersed ethylene-α-olefin copolymer,
wherein the amount of ethylene incorporated into the ethylene-α-olefin copolymer is in the range from 45 to 55 wt % based on the ethylene-α-olefin copolymer,
wherein the amount of ethylene-α-olefin copolymer is less than 15 wt % and at least 10 wt % based on the intermediate heterophasic propylene copolymer,
wherein the melt flow rate of the ethylene-α-olefin copolymer is in the range from 0.50 to 2.0 dg/min as calculated using the following formula:

$$MFR\ EPR = 10^{\wedge}\left(\frac{\text{Log } MFR \text{ heterophasic} - \text{matrix content} * \text{Log } MFR\ PP}{\text{rubber content}}\right)$$

wherein MFR heterophasic is the melt flow rate of the intermediate heterophasic propylene copolymer measured according to ISO1133 at 2.16 kg and 230° C.),
MFR PP is the MFR of the propylene-based matrix of the intermediate heterophasic propylene copolymer measured according to ISO1133 at 2.16 kg and 230° C.),
matrix content is the amount of the propylene-based matrix in the intermediate heterophasic propylene copolymer, and
rubber content is the amount of the dispersed ethylene-α-olefin copolymer in the intermediate heterophasic propylene copolymer,
wherein the sum of the total amount of propylene-based matrix and total amount of the dispersed ethylene-α-olefin copolymer in the intermediate heterophasic propylene copolymer is 100 wt % based on the intermediate heterophasic propylene copolymer wherein the final heterophasic propylene copolymer (A) has an emission of less than 1,800 mg/kg heterophasic propylene copolymer as determined by isopropanol extraction and analysis of the extract using PTV-GC-MS.

2. The process according to claim 1, wherein the intermediate heterophasic propylene copolymer is prepared using a phthalate-free catalyst, wherein the phthalate-free catalyst has a phthalate content of less than 150 ppm, based on the total weight of the catalyst.

3. The process according to claim 1, wherein the intermediate heterophasic propylene copolymer is prepared from propylene, ethylene and optionally another α-olefin by contacting propylene, ethylene and optionally another α-olefin in the presence of a catalyst composition to obtain the intermediate heterophasic propylene copolymer, wherein said catalyst composition is prepared by combining a procatalyst with a co-catalyst and optionally at least one external donor to form the catalyst composition,
wherein the procatalyst is prepared by a process comprising the steps of providing a magnesium-based support, contacting said magnesium-based support with a Ziegler-Natta type catalytic species, an internal donor, and an activator, to yield a procatalyst, wherein the activator is a benzamide according to formula X:

Formula X

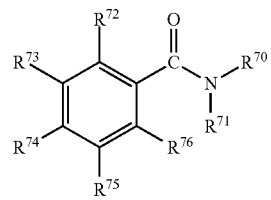

wherein $R^{70}$ and $R^{71}$ are each independently selected from hydrogen or an alkyl, and $R^{72}$, $R^{73}$, $R^{74}$, $R^{75}$, $R^{76}$ are each independently selected from hydrogen, a heteroatom or a hydrocarbyl group, and one or more combinations thereof; and wherein the internal donor is selected from the group consisting of 1,3-diethers represented by the Formula VII,

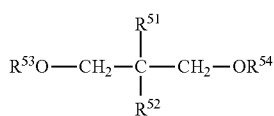

Formula VII wherein $R^{51}$ and $R^{52}$ are each independently selected from a hydrogen or a hydrocarbyl group selected from alkyl, alkenyl, aryl, aralkyl, or alkylaryl groups, and one or more combinations thereof, and wherein $R^{53}$ and $R^{54}$ are each independently selected from a hydrocarbyl group.

4. The process according to claim 1, wherein the α-olefin in the ethylene-α-olefin copolymer is propylene.

5. The process according to claim 1, the propylene-based matrix of the intermediate heterophasic propylene copolymer has a molecular weight distribution ($M_w/M_n$) in the range from 4.0 to 5.5, wherein Mw stands for the weight average molecular weight and Mn stands for the number average molecular weight are measured by SEC analysis.

6. The process according to claim 1, wherein the shifting ratio, which is the ratio of the final melt flow rate to the intermediate melt flow rate is in the range from 1.3 to 2.5.

7. A heterophasic propylene copolymer (A) having a final melt flow rate in the range of range from 65 to 110 dg/min as measured according to ISO1133 at 230° C. and 2.16 kg, and prepared by a process comprising:
visbreaking an intermediate heterophasic propylene copolymer (A') having an intermediate melt flow rate, which intermediate melt flow rate is lower than the final melt flow rate, to obtain the final heterophasic propylene copolymer,
wherein the intermediate heterophasic propylene copolymer (A') consists of
(a) a propylene-based matrix, wherein the propylene-based matrix consists of a propylene homopolymer, wherein the melt flow rate of the propylene-based matrix is in the range from 75 to 85 dg/min as measured according to ISO1133 at 230° C. and 2.16 kg,
(b) a dispersed ethylene-α-olefin copolymer,
wherein the amount of ethylene incorporated into the ethylene-α-olefin copolymer is in the range from 45 to 55 wt % based on the ethylene-α-olefin copolymer,
wherein the amount of ethylene-α-olefin copolymer is less than 15 wt % and at least 10 wt % based on the intermediate heterophasic propylene copolymer,
wherein the melt flow rate of the ethylene-α-olefin copolymer is in the range from 0.50 to 2.0 dg/min as calculated using the following formula:

$$MFR\ EPR = 10^{\wedge}\left(\frac{\text{Log } MFR \text{ heterophasic} - \text{matrix content} * \text{Log } MFR\ PP}{\text{rubber content}}\right)$$

wherein MFR heterophasic is the melt flow rate of the intermediate heterophasic propylene copolymer measured according to ISO1133 at 2.16 kg/230° C.,
MFR PP is the MFR of the propylene-based matrix of the intermediate heterophasic propylene copolymer measured according to ISO1133 at 2.16 kg/230° C.,
matrix content is the amount of the propylene-based matrix in the intermediate heterophasic propylene copolymer, and
rubber content is the amount of the dispersed ethylene-α-olefin copolymer in the intermediate heterophasic propylene copolymer,
wherein the sum of the total amount of propylene-based matrix and total amount of the dispersed ethylene-α-olefin copolymer in the intermediate heterophasic propylene copolymer is 100 wt % based on the intermediate heterophasic propylene copolymer; wherein the heterophasic propylene copolymer (A) has an emission of less than 1,800 mg/kg heterophasic propylene copolymer as determined by isopropanol extraction and analysis of the extract using PTV-GC-MS.

8. The heterophasic propylene copolymer according to claim 7, wherein the impact strength of the final heterophasic propylene copolymer (A) is at least 3.5 kJ/m² as determined at 23° C. according to ISO 180 4A.

9. A composition comprising the heterophasic propylene copolymer (A) of claim 7.

10. The composition according to claim 9, further comprising a nucleating composition (B), wherein (B) the nucleating composition comprises
(i) a first nucleating agent, which comprises a cyclic dicarboxylate salt compound; and
(ii) a second nucleating agent, which comprises talc,
wherein the cyclic dicarboxylate salt compound has the formula (I):

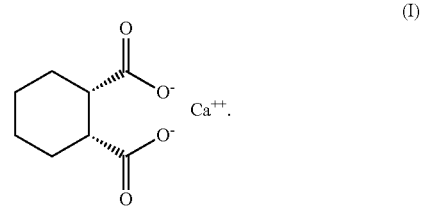 [SMILES: O=C([O-])[C@H]1CCCC[C@H]1C(=O)[O-]]

(I)

11. The composition according to claim 10, having a flexural modulus of at least 1600 MPa, as determined at 23° C. in parallel and/or perpendicular direction according to ASTM D790 Procedure B on a sample of 65×12.7×3.2 mm.

12. An article comprising the heterophasic propylene copolymer of claim 7.

13. The article according to claim 12, wherein the article is a rigid packaging material, or a durable article, or lawn and garden equipment.

14. The process according to claim 3, wherein $R^{53}$ and $R^{54}$ are each independently selected from alkyl, alkenyl, aryl, aralkyl, or alkylaryl groups, and one or more combinations thereof.

15. The process according to claim 1,
wherein the final heterophasic propylene copolymer shows an emission of less than 1700 mg/kg heterophasic propylene copolymer as determined by isopropanol extraction and analysis of the extract using PTV-GC-MS;

wherein the shifting ratio, which is the ratio of the final melt flow rate to the intermediate melt flow rate is in the range from 1.5 to 2.2; and wherein the intermediate heterophasic propylene copolymer is prepared using a phthalate-free catalyst, wherein the phthalate-free catalyst has a phthalate content of less than 100 ppm, based on the total weight of the catalyst.

16. The heterophasic propylene copolymer according to claim 7, wherein the propylene-based matrix of the intermediate heterophasic propylene copolymer has a molecular weight distribution (Mw/Mn) in the range from 4.0 to 5.5.

* * * * *